United States Patent
Vansell et al.

(10) Patent No.: US 8,365,773 B2
(45) Date of Patent: Feb. 5, 2013

(54) VALVE DEVICE AND TESTING METHOD

(75) Inventors: Christopher Vansell, San Juan Capistrano, CA (US); Fred Collins, Rio Rico, AZ (US); Richard Getze, Arcadia, CA (US); Patrick Drayer, San Clemente, CA (US)

(73) Assignee: MCP Industries, Inc., Corona, CA (US)

( * ) Notice: Subject to any disclaimer, the term of this patent is extended or adjusted under 35 U.S.C. 154(b) by 1231 days.

(21) Appl. No.: 12/048,834

(22) Filed: Mar. 14, 2008

(65) Prior Publication Data

US 2009/0230343 A1  Sep. 17, 2009

(51) Int. Cl.
  F16L 55/10  (2006.01)
  F16K 24/04  (2006.01)
  F16K 15/00  (2006.01)
  F16K 27/00  (2006.01)

(52) U.S. Cl. ............... 138/90; 137/202; 137/516.25; 251/366

(58) Field of Classification Search ............ 138/90; 137/202, 516.25; 251/366
See application file for complete search history.

(56) References Cited

U.S. PATENT DOCUMENTS

| | | | |
|---|---|---|---|
| 785,594 A | 3/1905 | Crispin | |
| 924,641 A | 6/1909 | Crispin | |
| 3,152,604 A | 10/1964 | Freye et al. | |
| 4,104,004 A * | 8/1978 | Graef | 417/313 |
| 4,489,744 A | 12/1984 | Merrill | |
| D277,547 S | 2/1985 | Kanemitsu | |
| 4,640,304 A | 2/1987 | Looney | |
| 4,825,897 A * | 5/1989 | Shade | 137/271 |
| 4,951,701 A | 8/1990 | Boehmer | |
| 4,981,154 A * | 1/1991 | Bailey et al. | 137/202 |
| 5,022,423 A | 6/1991 | Britt | |
| 5,108,001 A | 4/1992 | Harris | |
| D329,200 S | 9/1992 | Collins | |
| D332,910 S | 2/1993 | Kanemitsu | |
| D345,081 S | 3/1994 | Adami et al. | |
| D351,458 S | 10/1994 | Linner | |
| D352,456 S | 11/1994 | Linner | |
| 5,529,091 A * | 6/1996 | Anderson | 137/513.7 |
| D376,154 S | 12/1996 | Thirumalaisamy et al. | |
| D380,038 S | 6/1997 | Bailey | |
| 5,743,442 A | 4/1998 | Barbe | |
| 5,769,429 A | 6/1998 | Smetters et al. | |
| D427,673 S | 7/2000 | Stout, Jr. | |
| D442,864 S | 5/2001 | Davies | |
| D465,350 S | 11/2002 | Byrne | |
| 6,497,246 B1 | 12/2002 | Nicewarner et al. | |
| D543,107 S | 5/2007 | Reed et al. | |
| D590,933 S | 4/2009 | Vansell et al. | |
| 2006/0162775 A1 | 7/2006 | Drayer | |

OTHER PUBLICATIONS

U.S. Appl. No. 29/305,936, filed Mar. 31, 2008, Vansell et al.

* cited by examiner

*Primary Examiner* — Len Tran
*Assistant Examiner* — Ryan Reis
(74) *Attorney, Agent, or Firm* — John J. Connors; Connors & Assoc. pc.

(57) ABSTRACT

Our valve device, which is used to purge air from a plumbing system, includes a unitary, elastomeric body comprising top wall, a circumferential wall connected to the top wall, and a housing with a cavity that is accessed through a pair of ports. A closure element is moveably disposed within the cavity and responds to fluid entering one port to close the other port. An adjustable strap detachably wrapped around an exterior of the circumferential wall holds our device securely to an open end of a riser conduit of the plumbing system during testing for leaks. The circumferential wall has at least two wall sections of different diameters to accommodate different sized conduits.

1 Claim, 3 Drawing Sheets

VALVE DEVICE AND TESTING METHOD

INCORPORATION BY REFERENCE

Any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND

Plumbing involves a large number of individual tasks relating to the assembly and testing of new and existing conduits. Such plumbing systems include pressurized fresh water systems, drainage systems, and waste/sewer systems found in new and existing residential and commercial construction, and typically include multiple riser conduits that may be vertically oriented. A typical plumbing task is the in-ground installation of new sewer lines, also referred to as soil or waste lines, for interconnection to existing main sewer lines or septic systems. The steps involved in a common installation include ground trenching, installation, assembly and connection of multiple pipe segments. The multiple pipe segments terminate at predetermined locations where they will ultimately be fitted with appropriate plumbing connections. These pipe segments are connected to various plumbing fixtures such as toilet outlets, sinks, and baths. Before the fixture can be connected and the dry wall build out completed, the plumbing system must be tested for leaks. To do this the plumbing system is filled with water, pressurized, and purged of entrapped air. The system is then inspected for leaks.

In one way of testing for leaks, the person conducting the test merely fills an input riser conduit with water until the water flows out of each riser. Subsequently, each riser conduit is capped. This method results in excess use of water that spills on the ground, creating a messy unsafe environment, is inefficient, and labor intensive. In an alternative method, a rubber or plastic seal is affixed to each riser conduit and water is introduced into the plumbing system. The user then inserts a nail or other sharp object into the seal to create a hole through which entrapped air in the riser conduit is released. When the air has been purged from the riser conduit and water begins to flow from the hole, the person conducting the test reinserts the nail into the hole to stop the flow. In U.S. patent application Ser. No. 11/045,033, Pub. No. 2006/0162775, Drayer discloses a device that eliminates using a nail to puncture a hole in a seal.

SUMMARY

Our valve device has one or more of the features depicted in the embodiment discussed in the section entitled "DETAILED DESCRIPTION OF ONE ILLUSTRATIVE EMBODIMENT." The claims that follow define our device and method, distinguishing them from the prior art; however, without limiting the scope of our device and method as expressed by these claims, in general terms, one or more, but not necessarily all, of their features are:

One, our device includes a unitary elastomeric body that fits over an open end of a plumbing conduit. The body has a top wall, a circumferential wall connected to the top wall, and a housing extending from an interior surface of the top wall. The housing includes a pair of ports and defines an inside space (also referred to as a cavity), which may be oblong. A moveable closure element is within the inside space, and in one position it closes one port and in another position it closes the other port. One port may be an outer port terminating in the top wall, and the other port may be an inner port terminating at or near an inner end of the housing. The space provides a cavity having a volume substantially from 0.2 to 0.5 cubic inches.

Two, the moveable closure element may be a float disposed within the space. The cavity has a volume that is greater than that of the moveable closure element and is configured so the float initially closes the inner port. As fluid fills the cavity, the float rises to close the outer port. In this embodiment, our device is designed to be mounted on the end of a vertically oriented conduit terminating in an open end in the atmosphere that is closed during testing by the device. The cavity is vertically disposed when our device is so mounted with the ports directly opposed to each other along a longitudinal axis of our device. The ports each have predetermined diameters that typically are of different dimensions. For example, the inner port may have a diameter greater than the outer port. When the closure element is a float, it may be spherical and may have a diameter greater than the predetermined diameters of the ports, for example, the spherical float may have a diameter substantially from 0.3 to 0.6 inches. The longest dimension of the cavity is vertically oriented during use and is substantially longer than the diameter of the spherical float. The shorter dimension of the cavity is only slightly greater than the float's diameter. The body, and particularly the housing forming the cavity, are sufficiently elastic and resilient to enable the rigid, spherical float to be pushed through one port, with this one port expanding as the spherical float passes through it and then contracting when the float is within the cavity.

Three, the circumferential wall may include an outer wall and an inner wall connected to the top wall. The outer circumferential wall has a diameter greater than the inner circumferential wall. The circumferential may be cylindrical walls and they are spaced apart along the longitudinal axis and the longitudinal axis is the common and co-extensive longitudinal axis to each wall. The circumferential wall closest to the top wall has an internal diameter that is less than an internal diameter of the other circumferential wall. The circumferential walls may each have external edges that define a pair of spaced apart external annular channels. One of the channels may include an adjustable, detachable strap. Tightening the strap around the body fitted to the end of a conduit will make the fit very snug and water tight. The internal diameter of the circumferential wall closest to the top wall may be substantially from 1.9 to 6.7 inches, and the internal diameter of the other circumferential wall may be substantially from 2.2 to 7.4 inches. The circumferential walls may each have an internal end that abuts an internal annular ledge.

Our method of testing a plumbing system employs our device that includes the pair of circumferential walls. It comprises the steps of (a) fitting the body member on the open end of the conduit with the open end being seated snugly within the inner circumferential wall when this open end has the first diameter and being seated snugly within the outer circumferential wall when the open end has the second diameter, (b) filling the plumbing system with a fluid comprising liquid and gas so the closure element moves within the cavity to close the outer port to pressurize the plumbing system, and (c) moving the closure element from the outer port to allow gas to escape through the outer port until essentially no more gas is present in the plumbing system.

These features are not listed in any rank order nor is this list intended to be exhaustive.

DESCRIPTION OF THE DRAWING

One embodiment of our valve device and testing method are discussed in detail in connection with the accompanying drawing, which is for illustrative purposes only. This drawing includes the following figures (Figs.), with like numerals indicating like parts.

DETAILED DESCRIPTION OF ONE ILLUSTRATIVE EMBODIMENT

Figure 1:
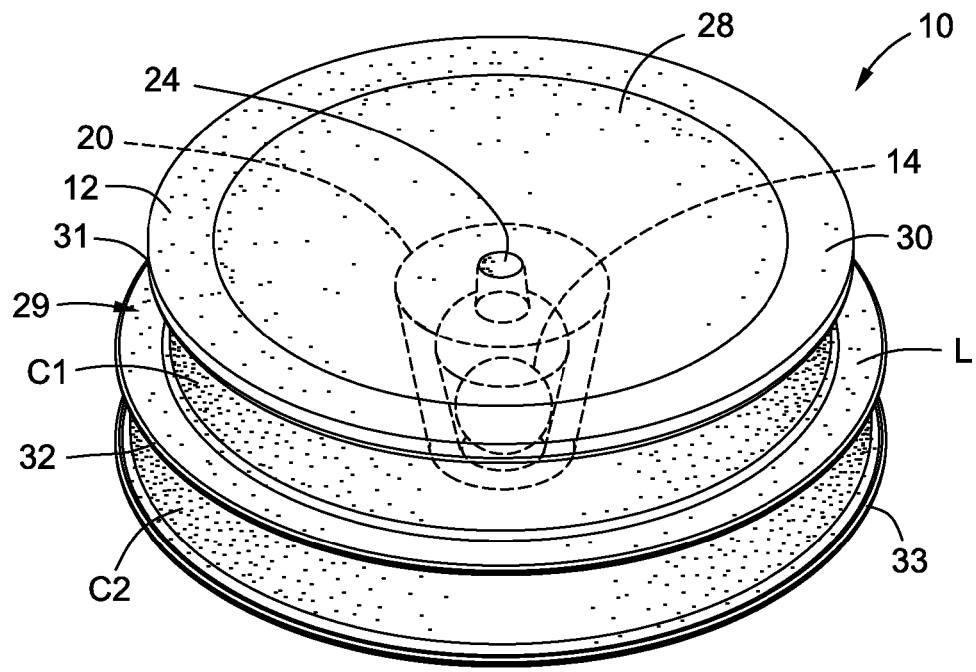
FIG. 1 is a perspective view looking at the exterior of the body of one embodiment of our valve device.
Figure 2:
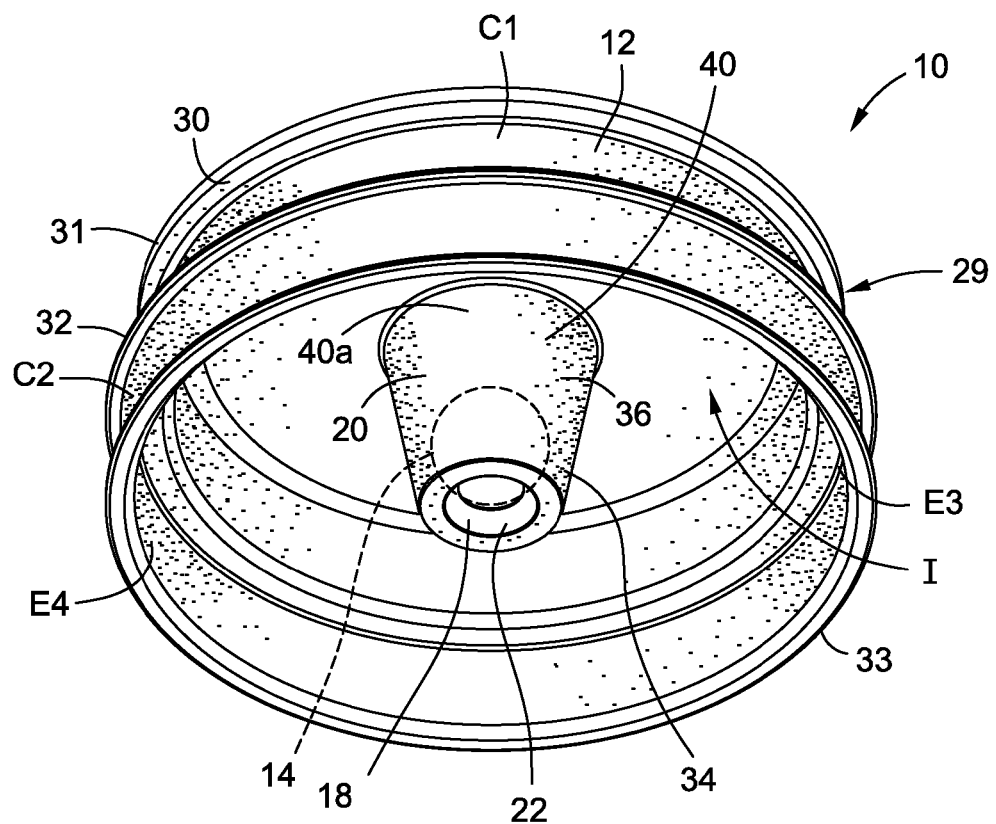
FIG. 2 is a perspective view looking at the interior of the body of our valve device shown in FIG. 1.
Figure 3A:
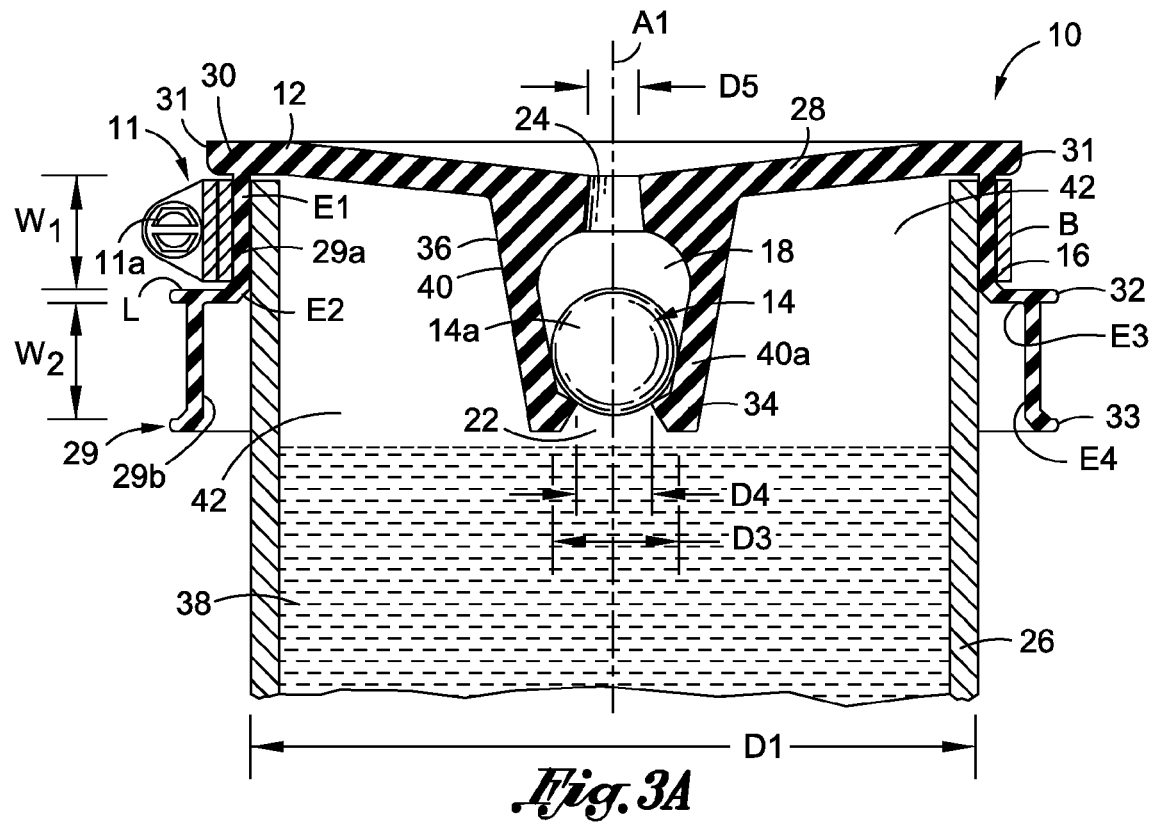
FIG. 3A is a cross-sectional view of our valve device shown in FIG. 1 mounted on a vertical riser conduit that is partially filled with un-pressurized liquid and the closure element sealing the inner port.

Our valve device is generally designated by the numeral 10, and as best shown in FIGS. 1, 2 and 3A, it includes: an elastomeric body 12, a closure element 14, and a strap 16. The elastomeric body 12 is a unitary, resilient structure that may be molded, for example, from a rubber material. Our device 10 is designed to fit snugly on an open end of a riser conduit 26 of a plumbing system (not shown). The open end of the riser conduit 26 has a circumference with a predetermined external cross-sectional configuration and dimensions. As shown in FIGS. 3A through 4, the strap 16 is tightened around the elastomeric body 12 prior to pressurizing the liquid 38 (usually water) in the riser conduit 26, and it is unloosened when our device 10 is to be removed from the end of the riser conduit 26 after testing the plumbing system.

In the one embodiment depicted, the strap 16 is a conventional, detachable hose strap comprising a metal band B having a predetermined width $w_1$ (FIG. 3A), for example, substantially from 0.4 to 0.6 inch. A connector 11 having a two-piece coupling component, one component at each end of the band B, enables the ends of the band to be attached to form a loop that extends around a circumferential wall 29 of the body 12. One of the coupling components may include a tightening screw 11a. The two-piece coupling component connects the ends of the band B and the diameter of the loop is adjusted to press into the body 12 and clamp the valve device 10 securely to the conduit 26.

Figure 3B:
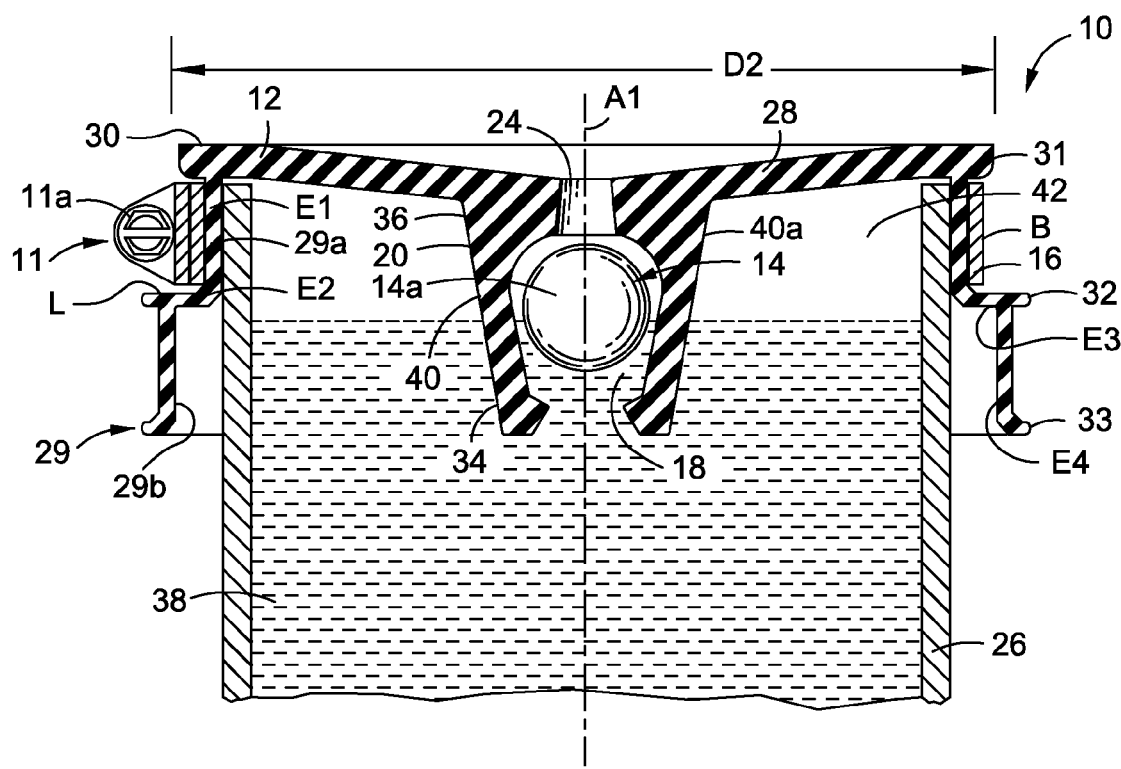
FIG. 3B is a cross-sectional view similar to that shown in FIG. 3A showing the housing cavity filled with pressurized liquid and the closure element just prior to sealing the outer port.
Figure 3C:
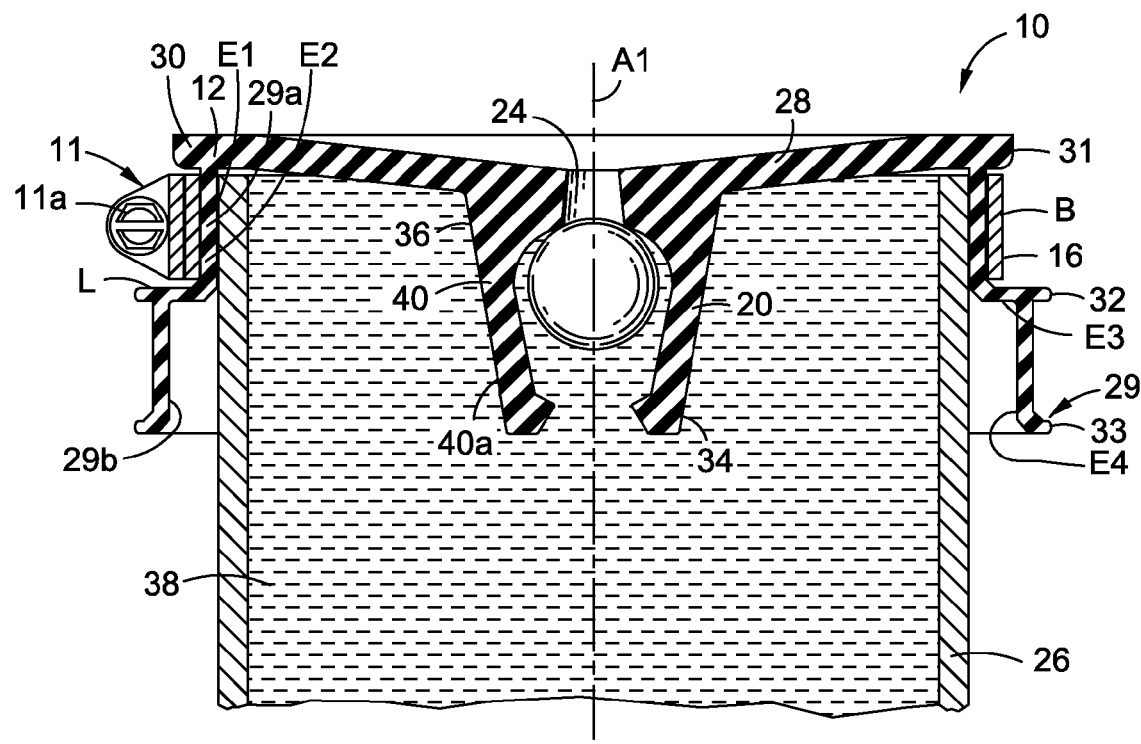
FIG. 3C is a cross-sectional view similar to that shown in FIG. 3A but showing the vertical conduit completely filled with pressurized liquid.
Figure 4:
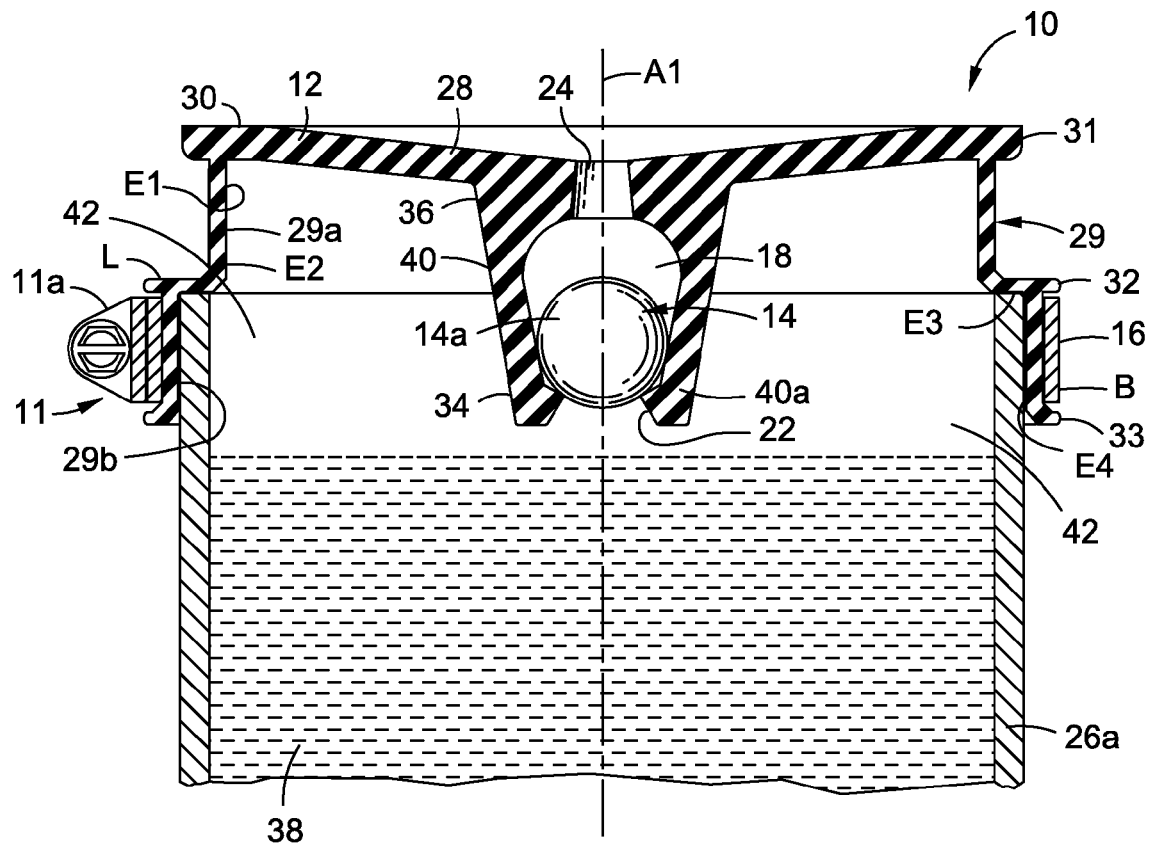
FIG. 4 is a cross-sectional view similar to that shown in FIG. 3A mounted on a vertical conduit that is has a diameter greater than the conduit depicted in FIG. 3A and partially filled with un-pressurized liquid.

As illustrated in FIGS. 3A through 3C, the elastomeric body 12 has a top wall 28, which in this embodiment is circular in configuration. The circumferential wall 29 has an internal, cross-sectional configuration and dimensions substantially corresponding to the external cross-sectional configuration and dimensions of the circumference of the end of the riser conduit 26. In the embodiment illustrated both the circumferential wall 29 and the end of the riser conduit 26 are cylindrical. In this one embodiment, the circumferential wall 29 extends along a central longitudinal axis A1, and it comprises a pair of juxtaposed cylindrical wall sections with different diameters: an inner cylindrical wall section 29a and an outer cylindrical wall section 29b. The inner cylindrical wall section 29a has an inside diameter D1 and the outer cylindrical wall section 29b has an inside diameter D2. Diameter D2 is larger than the inside diameter D1. The inside diameter D1 is substantially from 1.9 to 6.7 inches, and the inside diameter D2 is substantially from 2.2 to 7.4 inches. The circumferential wall 29 and the inner cylindrical wall 29a and outer cylindrical wall 29b lie along the common and co-extensive axis A1.

The inner cylindrical wall section 29a is connected at one end E1 along an edge 30 of a top wall 28, and terminates at an end E2 in a ledge L. In this one embodiment, the top wall 28 is circular. The end E1 is offset inward slightly from the edge 30 to form an annular lip 31. The outer cylindrical wall section 29b is connected at one end E3 to the ledge L, is offset inward slightly from the ledge to form a central annular lip 32, and terminates at an open end E4. Another lip 33 surrounds the open end E4. As best depicted in FIGS. 1 and 2, a channel C1 is formed on the exterior of the cylindrical wall section 29a by the spaced apart lips 31 and 32, and a channel C2 is formed on the exterior of the cylindrical wall section 29b by the spaced apart lips 32 and 33. The width W2 of these channels C1 and C2 may be different, but in this embodiment they are the same, and they are each equal to the width $w_1$ of the band B.

As best illustrated in FIGS. 2 and 3A through 3C, an elongated housing 20 within an interior I of the body 12 at least partially encloses the closure element 14. In the one embodiment depicted, the housing 20 is a truncated conical structure with an internal cavity 18. A central longitudinal axis of the housing 20 is in common and co-extensive with the central longitudinal axis A1. The housing 20 has opposed ends: an inner end 34 terminating in an inner opening or port 22 and an outer end 36 that is integral with and connected to the top wall 28. A central orifice in the top wall functions as an outer port 24. Both inner port 22 and outer port 24 have centers that are located on the central longitudinal axis A1 and are directly opposite each other. The housing 20 may have a tapered external wall 40 that extends from inner end 34 to terminate at the inner port 22. The inner port 22 has a diameter D4 and the orifice or outer port 24 has a diameter D5, which is less than the diameter D4. The diameter D4 is substantially from 0.3 to 0.4 inches, and the inside diameter D5 is substantially from 0.23 to 0.3 inches.

The closure element 14 may be a float, for example, a solid or hollow, rigid, spherical float member 14a having a density less than the liquid 38. The float member 14a has a diameter D3 substantially from 0.4 to 0.6 inches, which is greater than both the inner port diameter D4 and the outer port diameter D5. After forming the body 12, the float member 14a is pushed through the open inner port 22 into the cavity 18. The housing 20 is sufficiently elastic so the diameter of inner port 22 expands as the surrounding tapered wall structure 40a stretches. Once the float member 14a passes through the inner port 22, the surrounding tapered wall structure 40a is sufficiently resilient so it contracts to reduce the diameter of the inner port 22 to its original dimension. The internal cavity 18 of housing 20 provides sufficient interior space or volume so that the float member 14a may rise as the liquid 38 and any gas such as air 42 passes through inner port 22.

FIGS. 3A through 3C show our valve device 10 seated on the end of the riser conduit 26, which has an outside diameter substantially equal to the inside diameter D1 of the inner cylindrical wall section 29a. The strap 16 is shown lodged in the channel C1 and tightened to secure our device 10 to the end of the riser conduit 26. In FIG. 4 our valve device 10 is shown seated on a larger diameter riser conduit 26a having an outside diameter substantially equal to the diameter D2 of the outer cylindrical wall section 29a. The strap 16 is shown lodged in the channel C2 and tightened to secure our device 10 to the end of the conduit 26a. Regardless of the diameter sizes of the riser conduits 26 and 26a, our device 10 functions in the same manner when used in testing plumbing systems, namely:

As shown in FIGS. 3A through 3C, with our device 10 secured to the open end of the riser conduit 26 as discussed above, fluid comprising the liquid 38 and gas 42 fills the riser conduit. The float member 14a is initially in the position shown in FIG. 3A, closing the inner port 22. As the liquid level rises, the gas pushes the float member 14a outward to close the outer port 24. As liquid continues to fill the riser conduit 26, the pressure within the riser conduit increases. Periodically, the person conducting the test opens the valve device 10, for example, by inserting an elongated tool (not shown) through the outer port 24 to dislodge the float member 14a from this outer port 24 so air is released through it, or otherwise depress the top wall 28 so the float member 14a is dislodged from the outer port 24 to release air. This is repeated until essentially no more air escapes and a slight amount water begins to escape from the outer port 24. As shown in FIG. 3C, when the liquid 38 has completely filled the plumbing system, the float member 14a seals the outer port 24 and the gas 42 has been purged from the plumbing system. After inspecting for and repairing any leaks, our device 10 may be detached from conduit 16 by unfastening the strap 16.

Our valve device provides an efficient, low-cost and simple means for purging gas from a plumbing system and minimizes water flow out of the system during the process. In the one embodiment depicted, it may conveniently be used with conduits of different diameters, and the resilient, unitary body that may be molded at a low-cost. Our method is simple, cost effective, and reliable way to purge air from a plumbing system that does not result in excess use of water nor is labor intensive.

SCOPE OF THE INVENTION

The above presents a description of the best mode we contemplate of carrying out our valve device and testing method and of the manner and process of making and using it, in such full, clear, concise, and exact terms as to enable any person skilled in the art to which it pertains to make and use our valve device and testing method. Our valve device and testing method is, however, susceptible to modifications and alternate constructions from the illustrative embodiment discussed above which are fully equivalent. Consequently, it is not the intention to limit our valve device and testing method to the particular embodiment disclosed. On the contrary, our intention is to cover all modifications and alternate constructions coming within the spirit and scope of our valve device and testing method as generally expressed by the following claims, which particularly point out and distinctly claim the subject matter of our invention.

The invention claimed is:

1. A device for testing a plumbing system including a conduit terminating in an open end in the atmosphere that is closed during testing by the device, the device comprising
   a unitary, single piece elastomeric body member configured to fit over the open end of the conduit, and having
   a central longitudinal axis,
   a top wall,
   integral with the top wall a housing including an inside cavity having an inner port and an outer port in the top wall, said housing having a longitudinal axis that is common and co-extensive with the central longitudinal axis of the body member and opposed ends with one end of the housing being integral with the top wall and the other housing end being open and forming the inner port, said ports being along the central longitudinal axis of the body member, and
   a pair of cylindrical walls spaced apart along the axis with the central longitudinal axis being the common and co-extensive longitudinal axis to each wall, with the cylindrical wall closest to the top wall having an internal diameter that is less than an internal diameter of the other cylindrical wall,
   said cylindrical walls each having external edges that define a pair of spaced apart external annular channels, and
   float means within the cavity for opening and closing the ports, said float means normally closing the inner port and moving within the cavity under the influence of fluid flowing into the cavity through the inner port and filling the cavity so the float means rises within the cavity to close the outer port,
   said float means being a substantially spherical element that is less dense than water and the housing is sufficiently elastic to enable the spherical element to be pushed through one port, with the one port expanding as the spherical element passes through it and contracting when the spherical element is within the cavity, and
   an adjustable detachable strap within one of the channels.

\* \* \* \* \*